(12) United States Patent
Madsen

(10) Patent No.: US 10,899,484 B2
(45) Date of Patent: Jan. 26, 2021

(54) DEVICE FOR FORWARDING CLOSURE BLANKS FROM A WEB

(71) Applicant: Primoreels A/S, Vipperod (DK)

(72) Inventor: Valdemar Hougaard Madsen, Copenhagen K (DK)

(73) Assignee: Primoreels A/S, Vipperod (DK)

( * ) Notice: Subject to any disclaimer, the term of this patent is extended or adjusted under 35 U.S.C. 154(b) by 344 days.

(21) Appl. No.: 15/758,757

(22) PCT Filed: Sep. 9, 2016

(86) PCT No.: PCT/DK2016/050298
§ 371 (c)(1),
(2) Date: Mar. 9, 2018

(87) PCT Pub. No.: WO2017/041808
PCT Pub. Date: Mar. 16, 2017

(65) Prior Publication Data
US 2020/0239167 A1 Jul. 30, 2020

(30) Foreign Application Priority Data
Sep. 11, 2015 (DK) .................. 2015 70587

(51) Int. Cl.
*B65B 7/16* (2006.01)
*B65B 7/28* (2006.01)
*B65G 15/12* (2006.01)

(52) U.S. Cl.
CPC ............ *B65B 7/162* (2013.01); *B65B 7/2814* (2013.01); *B65G 15/12* (2013.01)

(58) Field of Classification Search
CPC .......... B65G 15/12; B65G 15/14; B65B 7/28; B65B 7/16; B65B 7/162; B65B 7/2814; B65B 7/164; B65B 7/2871; B65B 7/2828
(Continued)

(56) References Cited

U.S. PATENT DOCUMENTS

| 3,783,581 A | 1/1974 | Pierce |
| 3,874,145 A | 4/1975 | Schmidt |

(Continued)

FOREIGN PATENT DOCUMENTS

| AT | 315748 B | 6/1974 |
| CA | 1075212 A1 | 4/1980 |

(Continued)

OTHER PUBLICATIONS

International Search Report; European Patent Office; International Application No. PCT/DK2018/050298; dated Mar. 9, 2017; 7 pages.

(Continued)

*Primary Examiner* — James R Bidwell
(74) *Attorney, Agent, or Firm* — Taft Stettinius & Hollister LLP

(57) ABSTRACT

The present invention relates to a device for forwarding a web of closure blanks. The device preferably comprises a closure blank support comprising two parallel support surfaces each extending horizontally from a proximal end to a distal end with a distance in-between and each being moveable in a first direction with a first velocity, and a feeding device adapted to feed an unbroken web of individual closure blanks onto the closure blank support at the proximal end thereof with the rims of the web in contact with the support surfaces and with a feed speed substantially equal to said first velocity.

6 Claims, 3 Drawing Sheets

(58) Field of Classification Search
USPC .......................................................... 198/817
See application file for complete search history.

(56) References Cited

U.S. PATENT DOCUMENTS

| | | | |
|---|---|---|---|
| 3,927,506 A | | 12/1975 | Abd-Alla |
| 4,077,718 A | | 3/1978 | Graham, Jr. et al. |
| 4,077,829 A | | 3/1978 | Pupp et al. |
| 4,176,507 A | | 12/1979 | Mancini |
| 4,563,855 A | * | 1/1986 | Smith .................... B65B 43/52 |
| | | | 53/282 |
| 4,625,498 A | | 12/1986 | Parsons |
| 4,819,413 A | | 4/1989 | Mancini |
| 5,857,309 A | * | 1/1999 | Cicha .................... B65B 55/10 |
| | | | 53/167 |
| 6,073,422 A | | 6/2000 | Massey et al. |
| 6,122,821 A | * | 9/2000 | Dornieden ........... B23P 21/004 |
| | | | 29/791 |
| 7,975,362 B2 | * | 7/2011 | Gysi .................... B21D 51/443 |
| | | | 198/345.3 |
| 2011/0100986 A1 | | 5/2011 | Henriksen et al. |
| 2012/0190521 A1 | * | 7/2012 | Rivera .................. B65B 29/025 |
| | | | 493/58 |

FOREIGN PATENT DOCUMENTS

| | | |
|---|---|---|
| EP | 0065380 A1 | 11/1982 |
| EP | 0141572 A2 | 5/1985 |
| EP | 1737731 B1 | 9/2008 |
| WO | 2005102842 A1 | 11/2005 |

OTHER PUBLICATIONS

Written Opinion of the International Searching Authority; European Patent Office; International Application No. PCT/DK2016/050298; dated Mar. 9, 2017; 12 pages.

International Preliminary Report on Patentability; The International Bureau of WIPO; International Application No. PCT/DK2016/050298; dated Jan. 8, 2018; 22 pages.

* cited by examiner

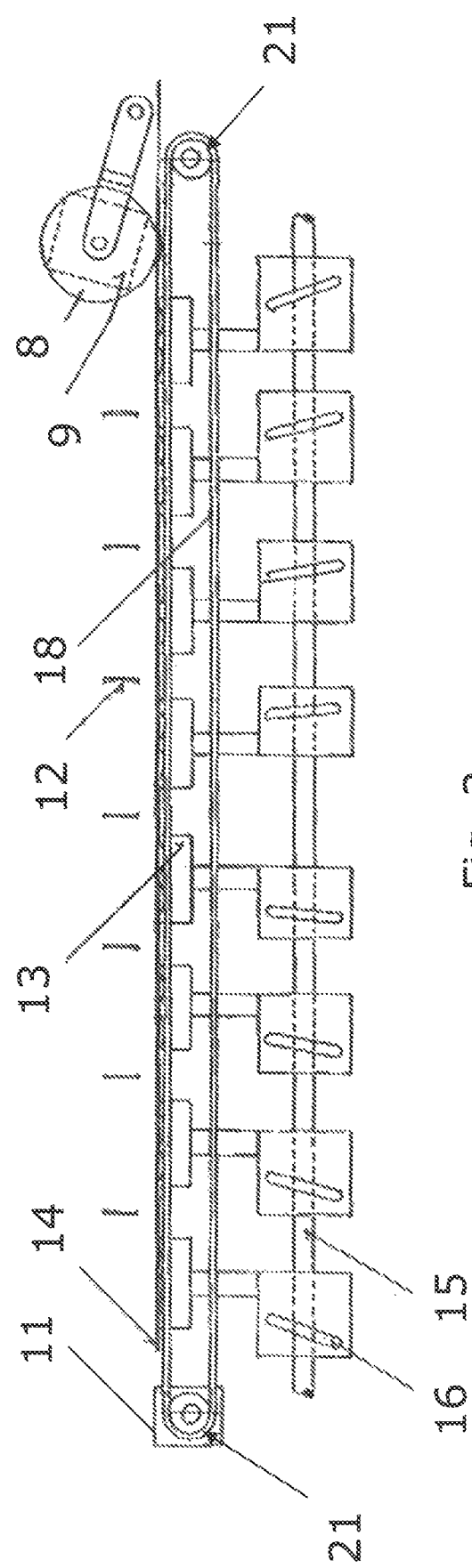
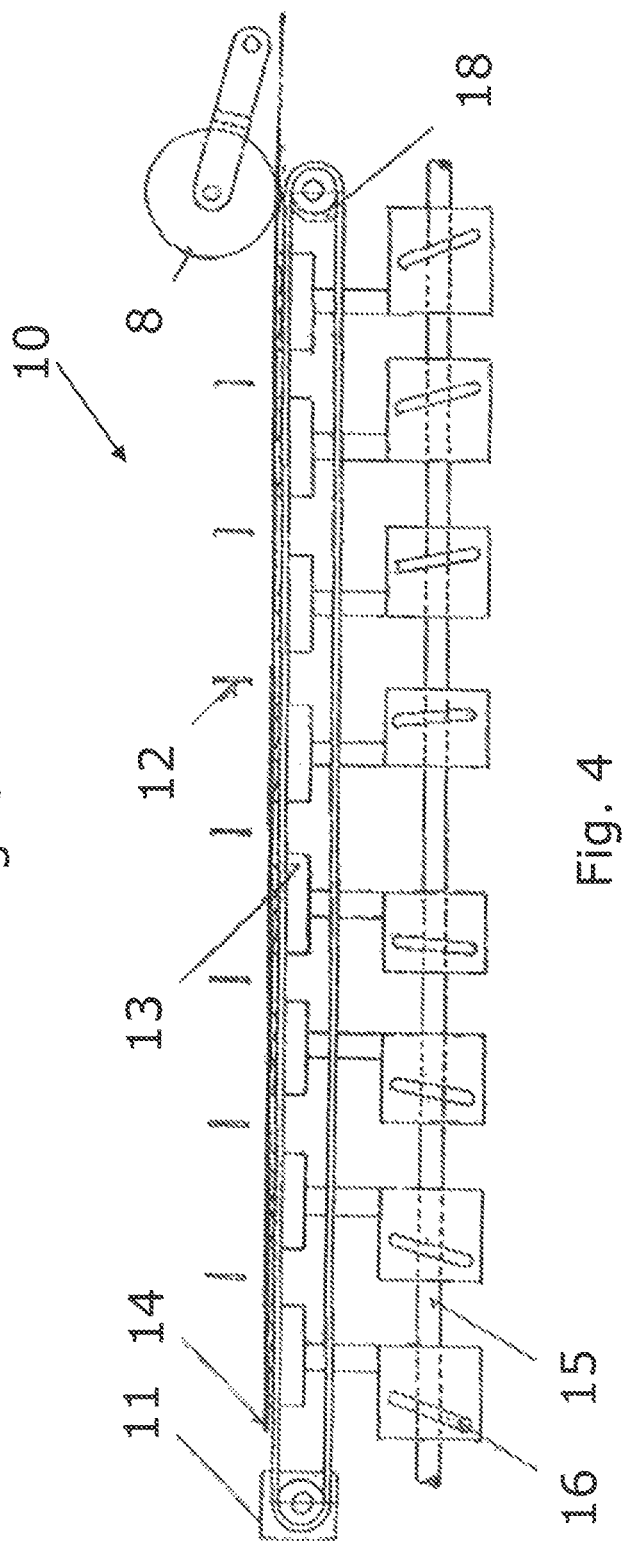
Fig. 3
Fig. 4

DEVICE FOR FORWARDING CLOSURE BLANKS FROM A WEB

CROSS-REFERENCE TO RELATED APPLICATIONS

This application is a U.S. national stage filing of International Application No. PCT/DK2016/050298 filed Sep. 9, 2016, which claims priority to Danish Patent Application No. PA 2015 70587 filed Sep. 11, 2015, each of which are incorporated herein by reference in their entirety.

FIELD OF THE INVENTION

The present invention relates to a device for forwarding a web of closure blanks. The device preferably comprises a closure blank support comprising two parallel support surfaces each extending horizontally from a proximal end to a distal end with a distance in-between and each being moveable in a first direction with a first velocity, and a feeding device adapted to feed an unbroken web of individual closure blanks onto the closure blank support at the proximal end thereof with the rims of the web in contact with the support surfaces and with a feed speed substantially equal to said first velocity.

BACKGROUND OF THE INVENTION

European Patent No. EP 1737731 B1 relates to a container closure application system where closure blanks from a web are advanced above a row of containers, separated individually and brought in register with the corresponding containers for sealing on the containers, In the description of Patent No. EP 1737731 B1 is mentioned that the closure blanks are advanced by a pushing action, which is also the case on equipment built under that Patent.

The big concentration trend in the dairy and other food processing industries has resulted in fewer but larger production units. This again calls for lager equipment for filling and packing food products, filling machines with 8 to 12 rows of containers are now installed in many plants.

As shown in FIG. 1 the closure blanks in the known art are pushed over a fixed set of supports. Friction between the advancing closure blanks and the fixed supports will, depending upon the shape of the closure blanks and the material used for the supports, put a limitation to the number of closure blanks which can be advanced without the risk of crumpling up. Reference is made to FIG. 1 illustrating a known device for forwarding closure blank. In FIG. 1, numeral 1 is a roller for advancing the closure blanks on the fixed closure blank supports; 2 is the drive unit for the roller; and 3 is a fixed closure blank support in the sense that the surfaces supporting the web is stationary relatively to the horizontal movement of the web. Numeral 4 is an upper part of the closure blank support with a built in pneumatically operated fasteners keeping the closure blanks in position during the separating process (cutting); 5 is a pneumatically operated fastener; and 6 is a cutting knife for separating the closure blanks. 7 is a turning device with small suctions cups keeping the closure blank in place during the turning and downward travel towards the container below. In the prior art as shown in FIG. 1 the turning devices only function were to keep the closure blanks during their turning towards the container below, fastening during separation were effected by the pneumatic fasteners item 5 in FIG. 1.

While the system disclosed in FIG. 1 may function reasonable with relatively low web speed (the speed at which the web of closure blanks are moved horizontally on the closure blank support 3) and relatively thick closure blanks, the system disclosed in FIG. 1 will distort the moved web (e.g. create wrinkles, crumple or the like) and/or the web will "fly away" from the support during movement, when the web speed is increased and/or the thickness of the web decreased.

Hence, an improved device for forwarding closure blanks would be advantageous, and in particular a more efficient and/or reliable device for forwarding closure blanks would be advantageous.

OBJECT OF THE INVENTION

It is the object of this invention to provide a system forwarding closure blanks from a web to a position above a row of containers without the risk of crumpling up caused by friction between the advancing closure blanks and their supports. An object of the present invention is to provide an alternative to the prior art.

SUMMARY OF THE INVENTION

Thus, the above described object and several other objects are intended to be obtained in a first aspect of the invention by providing a device for forwarding a web of closure blanks. The device preferably comprises a closure blank support comprising two parallel support surfaces each extending horizontally from a proximal end to a distal end with a distance in-between and each being moveable in a first direction with a first velocity, and feeding device adapted to feed an unbroken web of individual closure blanks onto the closure blank support at the proximal end thereof with the rims of the web in contact with the support surfaces and with a feed speed substantially equal to said first velocity.

In some embodiments, substantially refers to that the speed of the support surfaces 20 is between 0 and 5%, such as between 0 and 10% higher than the feed speed. In other embodiments, by substantially is preferably meant that the design and manufacturing of the various components aims at equalizing the feed speed and the speed of the support surfaces but due to manufacturing process deviations from this design and manufacture aim may occur.

In still other embodiments, the device for forwarding is adapted to the provide said first velocity being higher than the feed speed. This may be accomplished by setting the speed of the feeding device to provide a feed speed being lower the first velocity or setting the first velocity to be higher than the feed speed.

By higher is preferably meant that the first velocity is between 0 and 200%, such as between 0 and 150%, preferably between 0 and 100%, such as between 0 and 50%, preferably between 0 and 25%, such as between 0 and 20%, preferably between 0 and 10%, preferably between 0 and 5% higher than feed speed.

It is noted that while the feeding device is adapted to feed with a feed speed equal to or lower than the first velocity, this may also be accomplished by setting the first velocity to be higher in relation to the feed speed.

The device according to the present invention preferably forwards closure blanks to a position above a row of containers.

The object of the invention suggested accomplished by using a support system for the advancing closure blanks moving forward with a speed corresponding to feed speed at which a web of closure blanks is fed onto the closure blank support;

In the present context, a number of terms are used in manner being ordinary to a skilled person. Some of these terms are detailed in the following:

Closure blank preferably refers to a sheet of material, such as plastic, metal or combinations thereof, having a shape making it suitable for closing a container. In the web, the closure blanks are typically arranged unbroken side-by-side; typically the connection between two adjacent closure blanks is constituted by a scoring line allowing the closure blanks to be drawn apart along the scoring line. A closure blank is preferably configured to be welded and/or glued to an upper opening of a container.

Web of closure blanks preferably refers to elongate sheet of material with cut-outs each defining the outer shape of closure blank.

Rim (of web) preferably refers to the longitudinal sections of the web.

Roller preferably refers to an element rotatable arranged along a longitudinal axis of the element.

Further embodiments of the invention are presented below as well as in the accompanying claims.

BRIEF DESCRIPTION OF THE FIGURES

The present invention and in particular preferred embodiments thereof will now be described in more detail with regard to the accompanying figures. The figures show one way of implementing the present invention and is not to be construed as being limiting to other possible embodiments falling within the scope of the attached claim set.

FIG. 2 also shows the principle of forwarding and separating the closure blanks, FIG. 3 shows the device of FIG. 2 in a side view, FIG. 4 shows a device seen from above according to a further embodiment of the present invention.

DETAILED DESCRIPTION OF PREFERRED EMBODIMENTS

Figure 1:
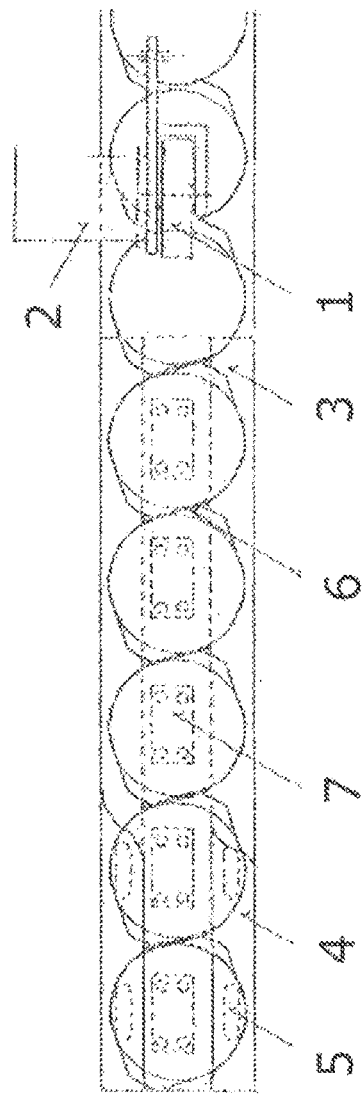
FIG. 1 shows the principle of forwarding and separating the closure blanks in known device.
Figure 2:
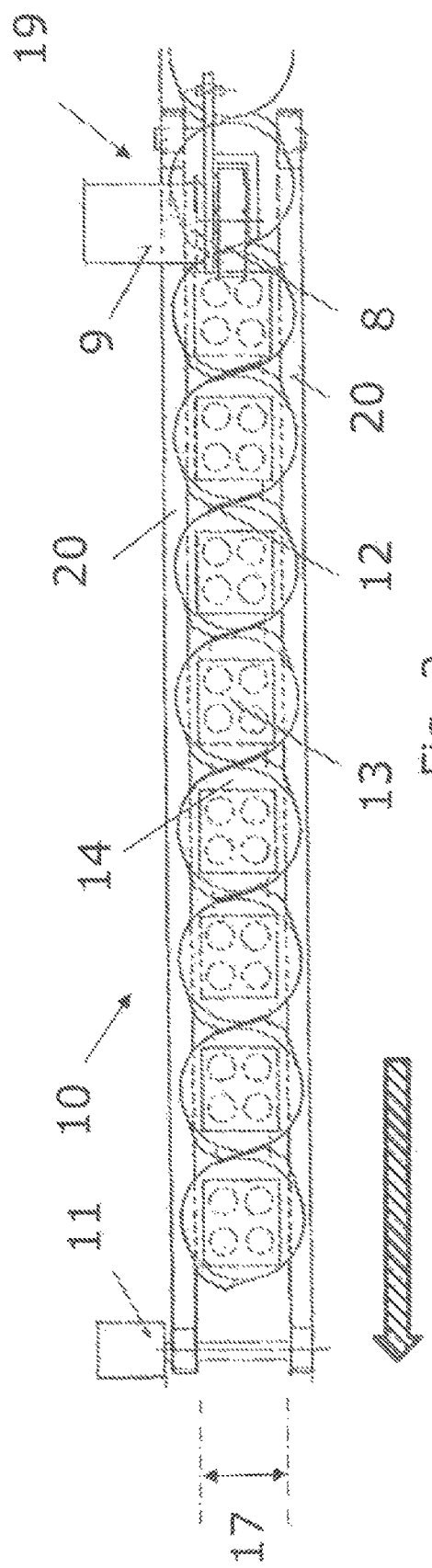
FIG. 2 shows a device seen from above according a first embodiment according to the present invention.

Reference is made to FIG. 2 showing schematically an embodiment of a device for forwarding closure blanks. FIG. 2 shows the device as seen from above. As showed in FIG. 2, the periphery speed of the roller 8 pushing the closure blanks forward is synchronized with to the speed of the support surfaces 20. When the web of closure blanks is in place above the row of containers situated below the device, a turning device is moved up under each closure blank. In the embodiment shown in FIG. 2 the turning device is equipped with suction cups which are able to keep the closure blank in place during the separating process and the following turning towards the container below.

The line separating two closure blanks in the web has perforations (scoring lines) facilitating the separation process. In the prior art the perforations had to leave sufficient stiffness in a row of closure blanks to overcome the friction between closure blanks and the fixed supports. In embodiments according to the invention proper design of the perforations between two adjoining closure blanks in a web can make it possible that separation can be done without the use of knives, simply by the devices on the turning units moving the closure blanks apart during the downward travel towards the containers.

As shown in FIG. 2, a device for forwarding a web of closure blanks to a position above a row of containers (not shown) according to a preferred embodiment comprises a closure blank support 10. The closure blank support 10 has two parallel support surfaces 20 each extending horizontally from a proximal end (right hand side in FIG. 2) to a distal end (left hand side in FIG. 2) with a distance 17 in-between. The distance is configured so that a rim of the web of closure blank is abutting the support surfaces 20. In the embodiment shown in FIG. 2 each closure blank is a disc with two flaps extending outside the circle forming a major part of the edge of the disc.

The support surfaces 20 are each moveable in a first direction with a first velocity; this is shown in FIG. 2 with the crossed arrow in the lower left corner of FIG. 2. The device for forwarding closure blanks further comprising a feeding device 19 adapted to feed an unbroken web of individual closure blanks onto the closure blank support 10 at the proximal end thereof with the rims of the web in contact with the support surfaces 20 as shown in FIG. 20 by the dotted line illustrating the course of the edge of the support surfaces below the closure blank. The feeding device is adapted to feed the web of closure blanks onto the support surfaces at a feed speed substantially equal to said first velocity. By substantially is preferably meant that the design and manufacturing of the various components aims at equalizing the feed speed and the speed of the support surfaces 20 but due to manufacturing process deviations from this design and manufacture aim may occur. In other embodiments, substantially refers to that the speed of the support surfaces 20 is between 0 and 5%, such as between 0 and 10% higher than the feed speed.

In still other embodiments, the device for forwarding is adapted to the provide said first velocity being higher than the feed speed.

This may be accomplished by setting the speed of the feeding device to provide a feed speed being lower the first velocity or setting the first velocity to be higher than the feed speed.

By higher is preferably meant that the first velocity is between 0 and 200%, such as between 0 and 150%, preferably between 0 and 100%, such as between 0 and 50%, preferably between 0 and 25%, such as between 0 and 20%, preferably between 0 and 10%, preferably between 0 and 5% higher than feed speed. It is noted that while the feeding device is adapted to feed with a feed speed equal to or lower than the first velocity, this may also be accomplished by setting the first velocity to be higher in relation to the feed speed.

As shown in FIG. 3 (showing the device of FIG. 2 in a side view) the two parallel support surfaces 20 comprising at least two closed-loops and longitudinal extending conveyer belts 18 with a distance 17 (see FIG. 2) in-between. The device also has a conveyer belt pulley 21 common for both conveyer belts 18 at the proximal end and a conveyer belt pulley 21 common for both conveyer belts 18 at the distal end of the closure blank support 10. Common refers to that both conveyer belt runs over the same pulley as showed in FIG. 3.

In the embodiment of FIG. 3, a drive unit 11 is connected to the conveyer belt pulleys 21 at the distal end. However, the drive unit 11 may also be connected to the conveyer belt pulley 21 at the proximal end of the closure blank support 10. The drive unit 11 is arranged to rotate the conveyer belt pulley 21 (the proximal or the distal pulley) and as both the conveyer belts 18 runs over common pulleys, a rotation of one of the pulleys 21 provides a movement of the two conveyer belts.

As further showed in FIG. 3, the feeding device 19 comprises a roller 8 with an outer surface. Typically the roller 8 is a body have cylindrical outer surface. The roller 8 is arranged with it's rotational axis perpendicular to the longitudinal direction of the support surfaces 20 (as shown in FIG. 2) and with a section of its outer surface abutting (when no web of closure blanks 14 is arranged on the support surfaces 20) or slightly raised above or slightly lowered below the support surfaces 20, such as preferably raised/lowered less than 0.05 mm, preferably less than 0.1 mm, such as less than 0.25 mm, preferably less than 1.0 mm. The distance is preferably designed and selected to allow a firm grip on the web of closure blanks between the roller 8 and the support surfaces 20 whilst not deforming the web of closure blanks. In addition, the roller 8 can be biased against the support surfaces 20, e.g. by a spring, such as an adjustable spring (not shown). It is noted, that in embodiments where the roller 8 abuts the support surfaces 20, the width of the roller is so that it spans across the two support surfaces 20. It may be advantageously to arrange e.g. a counter pressure roller in a position below the roller 8 to allow a firm grip on the web of closure blanks between the roller 8 and the counter pressure roller. Alternatively, a smooth section may be arranged below the roller 8 allowing the roller 8 to rotate and the web of closure blanks 14 to glide along the smooth section while the smooth section provide a counter pressure on the roller 9.

As shown in FIGS. 2 and 3, the feeding device may further comprise a drive unit 9 connected to the roller 8 of the feeding device for rotating said roller 8.

When a drive unit 9 is connected to the roller 8 and a drive unit 11 is connected to one of the common pulleys, the speed of the drive units 9 and 11 must be set in order to provide a speed of the support surfaces 20 equal to or substantial equal to the feed speed. To accomplish this, the device may further comprising a synchronization between the drive unit 11 connected to one of the conveyer belt pulleys 21 and the drive unit connected to the roller 8 of the feeding device to synchronize the peripheral velocity of the roller 8 of the feeding device to the velocity of the support surfaces 20. Thus, the feed speed is provided by the pull in/push to the web of closure blanks provided by the combination of the roller 8 rotating clock wise (with reference to FIG. 3) and the movement of the conveyer belts 18's upper loop moving to the left in FIG. 3 (the lower loop of the conveyer belts moves to the right in FIG. 3). It is noted that the roller 8 and the support surfaces 20 are mutually arranged so that the roller as well as the support surfaces 20 abuts the web of closure blanks.

In a preferred embodiment, the synchronization comprising a geared connection (not shown) between the drive unit 11 of the feeding device and the drive unit connected to one of the conveyer belt pulleys 21.

In yet a further embodiment, the drive unit 11 of the feeding device and/or the drive unit connected to one of the conveyer belt pulleys 21 both are step controlled drive units, such as stepper motors being either electrical, pneumatic or hydraulic, and the synchronization comprising an electronic controlling unit controlling the rotation of the drive units.

Reference is made to FIG. 4 showing another embodiment of the invention. Numerals used in connection with FIGS. 2 and 3 are used for similar or identical elements in the embodiment of FIG. 4. Compared to the embodiment of FIG. 3, no drive unit is connected to the roller 8. In the embodiment of FIG. 4, the roller 8 of the feeding device is a freewheeling roller 8. Freewheeling refers preferably to that the rotation of the roller is accomplished by a drive unit 11 connected to one of the common pulleys 21 in the following manner. When the drive unit 11 rotates one of the common pulleys 21, the conveyer belt 18 will move (as disclosed above). If the surface of the roller 8 abuts the conveyer belts 18 and/or the pulley 21, the movement of the conveyer belts 18 and/or the pulley 21 will due to friction rotates the roller 8. Typically, a web is situated in between the surface of the roller 8 and conveyer belts 18 and the mutual friction between the surfaces of the web of closure blanks 14, the conveyer belts 18 and the roller 8 will due to the linear movements to the left (with reference to FIG. 4) result in that the web is moved to the left whereby the roller 8 will rotate with a circumferential speed equal or substantial equal to the speed of the conveyer belts 18.

Figure 5:
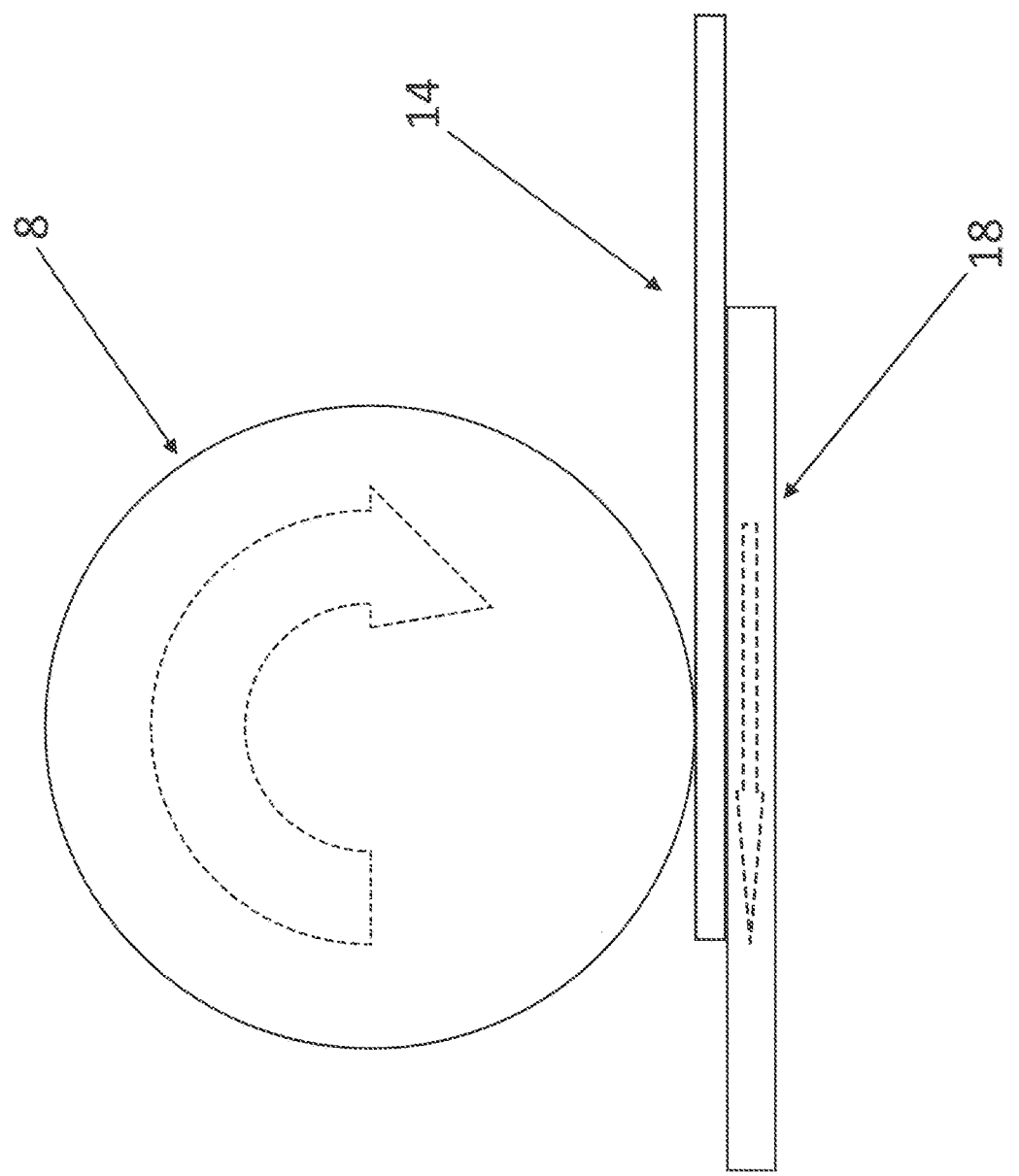
FIG. 5 shows schematically a feeding device according to some preferred embodiments the present invention.

In is noted that the feeding device according to the present invention may be constituted by the roller 8 co-operating with the conveyer belt 18. Thus, some preferred embodiments the feeding device may be viewed conceptually as showed in FIG. 5. In FIG. 5, 8 refers to the roller and 18 refers to a section of the conveyer belt—or in general—the support surface (20). As presented in FIG. 5 by the arrows in the roller 8 and in the conveyer belt 18, the two parts moves and as the web of closure blanks 14 is poisoned in-between the two parts 18 and 8 and friction is present, the closure blanks are moved forward.

In many preferred embodiments, the web of closure blanks is initially reeled onto a reel, the feeding device may preferably be adapted to pull the web from the reel and push the web onto the support surfaces. The pull and push action are preferably controlled by one or more of the surface roughness of the roller, the surface roughness of the support surfaces, the surface roughness of the web in combination with biasing the roller against the support surfaces.

As showed in FIGS. 3 and 4, a device according to preferred embodiment of the invention may further comprising a plurality of cutting knives 12 for separating individual closure blanks from the web of closure blanks. Such cutting knives are preferably reciprocatably arranged above the support surfaces 20.

Further, and as shown in FIGS. 3 and 4, a device according to the present invention may further comprise a device for moving individual closure blanks from a position where the closure blank is situated on the support surfaces 20 and to a position below the support surfaces 20. Such a device preferably comprises suction cups (showed in FIG. 2 as four circles below each closure blank) arranged on a turning device 13 to attach to the downward facing surface of closure blanks, the turning device being configured to move the suction cups downwardly and turning the suction cups to turn the closure blanks upside-down relatively to their position on the support surfaces 20.

The turning device 13 with the larger suction cups acts as a closure blank support and fastener during the separating process, the turning and downward travel towards the container below. As shown in FIGS. 3 and 4, the suction cups are situated below a web of closure blanks. When the situation shown in FIGS. 3 and 4 is accomplished (the web of closure blanks is arranged with an individual closure blank above each set of suction cups), the movement of the web of closure blank is stopped. Thereafter, the suction cups attach to the under-side of the closure blanks and, if needed and present, the knives 12 are activated to cut-loose each individual closure blanks. Due to the arrangement of the suction cups on an element comprising an inclined slit (relatively to vertical) which co-operates with a pin on a rotational shaft 15, the suction cups moves downwardly, whilst the distance between the suctions cups increased (accomplished by providing different inclinations to the individual slits as shown in FIGS. 3 and 4) and the suction cups are turned, preferably 180°. Now, the closure blanks are positioned at the containers ready for application to the containers. When the closure blanks are moved away from the support surfaces 20, the feeding device and the movement support surfaces are activated and a new row of closure blanks can be forwarded to the position above the suction cups. This repetitive operation can be continued as long as desired.

In the embodiment illustrated in the figures, the roller 8 is arranged with its rotational axis above the support surfaces 20. This can be inverted as the roller 8 can be arranged with its rotational axis below the support surfaces; if counter pressure is used e.g. with an counter pressure roller or a smooth surface as disclosed above, such elements positions are similar inverted.

The conveyer belts 18 disclosed herein can be conventional conveyer belt, such as conveyer belt having flat surface or be O-rings conveyer belts. Further, the suction may be applied in the support surfaces 20 which in case of e.g. flat conveyer belts may be embodied as a suction below the conveyer belt and the conveyer belts 18 comprising through going openings allowing the suction to be communication to the web of closure blanks, thereby sucking the web of closure blanks 14 onto the conveyer belts 18 (typically the rim thereof to onto the conveyer belt 18).

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCE SYMBOLS USED 1 roller for advancing the closure blanks on the fixed closure blank supports
2 the drive unit for the roller 1
3 a fixed closure blank support
4 an upper part of the closure blank support with a built in pneumatically operated fasteners keeping the closure blanks in position during the separating process (cutting)
5 a pneumatically operated fastener
6 a cutting knife for separating the closure blanks.
7 turning device with small suctions cups keeping the closure blank in place during the turning and downward travel towards the container below,
8 roller for advancing the closure blanks simultaneously with the forward movement of the closure blank supports.
9 drive unit for the roller 8.
10 closure blank support.
11 drive unit for the two closure blank supports 10.
12 cutting knife for separating the closure blanks.
13 turning device; the larger suction cups acting as a closure blank support and fastener during the separating process, the turning and downward travel towards the container below.
14 a web of closure blanks.
15 a shaft for vertical movement and 180° rotation of the turning devices during the vertical movement.
16 a slit in the cylindrical part of the turning device in mesh with a pin in the unit will move the closure blanks apart during the downward travel to the container below
17 distance, typically in the order of 10-100 mm
18 conveyer belt
19 feeding device
20 support surface
21 conveyer belt pulley.

The invention claimed is:

1. A device for forwarding a web of closure blanks (14), the device comprising
   a closure blank support (10) comprising two parallel support surfaces (20) each extending horizontally from a proximal end to a distal end with a distance (17) in-between and each being moveable in a first direction from the proximal end to the distal end with a first velocity;
   a feeding device (19) adapted to feed an unbroken web of individual closure blanks onto the closure blank support (10) at the proximal end thereof with the rims of the web in contact with the support surfaces (20) and with a feed speed wherein the feeding device (19) comprising a roller (8) with an outer surface, the roller (8) being arranged with its rotational axis perpendicular to the longitudinal direction of the support surfaces (20) and with a section of its outer surface abutting or slightly raised, such preferably raised less than 1.0 mm, preferably less than 0.25 mm, preferably less than 0.1 mm, preferably less than 0.05 mm
   wherein
   the two parallel support surfaces (20) comprising at least two closed-loops and longitudinal extending conveyer belts (18) with a distance (17) in-between, the conveyer belts (18) having a flat surface or are O-rings conveyer belts, and wherein device comprising a conveyer belt pulley (21) common for both conveyer belts at the proximal end and a conveyer belt pulley (21) common for both conveyer belts at the distal end of the closure blank support (10)
   the device further comprising a drive unit (11) connected to the conveyer belt pulleys (21) at the distal end or to the conveyer belt pulley (21) at the proximal end for rotating the conveyer belt pulley in question (21) to provide a movement of the two conveyer belts,
   wherein
   the device for forwarding is adapted to the provide said first velocity being higher than the feed speed.

2. A device according to claim 1, wherein the roller (8) is biased against the support surfaces (20).

3. A device according to claim 1, wherein the feeding device further comprising a drive unit (9) connected to the roller (8) of the feeding device for rotating said roller (8).

4. A device according to claim 1, wherein the roller of the feeding device is a freewheeling roller (8).

5. A device according to claim 1, wherein the device further comprising a plurality of cutting knives (12) for separating individual closure blanks from the web of closure blanks, the cutting knives are reciprocatively arranged above the support surfaces (20).

6. A device according to claim 1, wherein the device further comprising a device for moving individual closure blanks from a position where the closure blank is situated on the support surfaces (20) and to a position below the support surfaces (20), said device comprising suction cups arranged on a turning device (13) to attach to the downward facing surface of closure blanks, the turning device being configured to move the suction cups downwardly and turning the suction cups to turn the closure blanks upside-down relatively to their position on the support surfaces (20).

* * * * *